(12) United States Patent
Kiuru et al.

(10) Patent No.: US 7,173,250 B2
(45) Date of Patent: Feb. 6, 2007

(54) DRIFT-TYPE DETECTOR WITH LIMITED NOISE LEVEL

(75) Inventors: Erkki Sakari Kiuru, Espoo (FI); Heikki Johannes Sipilä, Espoo (FI)

(73) Assignee: Oxford Instruments Analtyical Oy, Espoo (FI)

( * ) Notice: Subject to any disclaimer, the term of this patent is extended or adjusted under 35 U.S.C. 154(b) by 307 days.

(21) Appl. No.: 10/881,420

(22) Filed: Jun. 29, 2004

(65) Prior Publication Data
US 2005/0285018 A1    Dec. 29, 2005

(51) Int. Cl.
*G01T 1/24* (2006.01)
(52) U.S. Cl. .................................... 250/370.01
(58) Field of Classification Search ............ 250/370.01
See application file for complete search history.

(56) References Cited

U.S. PATENT DOCUMENTS

| | | | | |
|---|---|---|---|---|
| 5,923,794 | A  * | 7/1999 | McGrath et al. | 382/312 |
| 6,414,746 | B1 * | 7/2002 | Stettner et al. | 356/4.01 |
| 6,538,253 | B2 * | 3/2003 | Petrick et al. | 250/370.09 |
| 6,573,762 | B1 * | 6/2003 | Wessendorf et al. | 327/100 |
| 2004/0065836 | A1 * | 4/2004 | Schick et al. | 250/370.01 |

* cited by examiner

*Primary Examiner*—David Porta
*Assistant Examiner*—David S. Baker
(74) *Attorney, Agent, or Firm*—Wood, Philips, Katz, Clark & Mortimer

(57) ABSTRACT

A drift detector produces an indication of an occurred hit of a quantum in the detector element. For neutralising accumulated charge in the detector element, indications of occurred hits are used to trigger pulses of deliberately increased neutralisation current into the drift detector for the duration of a limited time interval. Alternatively such triggering may be based on the operation of a timer.

19 Claims, 4 Drawing Sheets

DRIFT-TYPE DETECTOR WITH LIMITED NOISE LEVEL

TECHNICAL FIELD

The invention concerns generally the technology of solid-state detectors for electromagnetic radiation. Especially the invention concerns a way of reducing noise in a drift-type detector used e.g. to detect X-rays.

BACKGROUND OF THE INVENTION

A traditional solid-state detector type to be used for X-ray detection in e.g. imaging and spectroscopy applications is the PIN detector. There the detecting element is a reverse biased PIN diode, one electrode of which is coupled to the gate of a FET (field-effect transistor). X-ray quanta that hit the PIN diode cause a photoelectric effect, creating a number of free electrons and holes in a depleted region formed in the semiconductor material. The bias voltage across the PIN diode causes the mobile charge carriers to be drawn to the electrodes, which changes electrode potential. An integrator coupled to the FET transforms the change of the PIN diode's electrode potential into a corresponding change in a voltage across a feedback capacitor.

As X-ray quanta keep hitting the PIN diode one after another, a graph of the capacitor voltage as a function of time starts resembling a stepwise ramp, which gradually approaches a limit of the detector's dynamic range. Before that happens, the accumulated charge from the electrodes of the PIN diode must be neutralised, after which a new ramping period begins and the same steps are repeated. Known techniques for neutralising the accumulated charge include briefly coupling one electrode of the PIN diode to a current source, using an optically active FET that is briefly triggered into a more conductive state by an optical activation pulse, and causing a momentary swing in the bias voltage of the PIN diode. The correct moment for performing the switched neutralisation can be found by comparing the capacitor voltage to a reference, so that reaching the reference triggers the neutralising action.

A drift detector is a newer detector type, with better noise characteristics and consequently better energy resolution than traditional PIN detectors. Said better noise characteristics also allow combining drift detectors with faster processing electronics, which is an advantage. A good overview about certain important aspects of known drift detector technology is given in Carlo Fiorini, Peter Lechner: "Continuous Charge Restoration in Semiconductor Detectors by Means of the Gate-to-Drain Current of the Integrated Front-End JFET", IEEE Transactions on Nuclear Science, Vol. 46, No. 3, June 1999.

FIG. 1 is a schematic circuit diagram of a known drift detector. What appears as a diode 101 in the diagram is a specific semiconductor detector component that differs e.g. from the PIN diodes of known PIN detectors in that it comprises a field electrode arrangement adapted to control the movements of charge, as well as an integrated amplifier component, essentially a FET 102. The capacitance of the drift detector diode 101 is much smaller than that of a PIN diode. The basic semiconductor material is typically silicon, although other materials are not excluded from consideration. Received X-ray quanta again cause the accumulation of charge as the result of a photoelectric effect. The accumulating charge draws the gate potential of the integrated FET 102 into the negative direction. The FET is coupled to act as a follower, which means that its source potential mimics the change in the gate potential, so that from said source potential a signal may be taken to amplification and detection.

Lowering gate and source potentials in the FET 102 increase the drain-source voltage, which in turn gives rise to increasing currents through the FET 102. A leakage current 103 from the drain to the gate increases, continuously neutralising the accumulating charge that resulted from the detected quanta, until a dynamic equilibrium state is reached, in which the neutralising effect of the leakage current is equal to the mean rate of charge accumulation.

As an inherent problem of the composition of a drift detector comes the character of the neutralising current as a basically random process of moving charge carriers across interfaces between doped regions in a semiconductor. Additionally it should be noted that since hits occur at random in the detector, the magnitude of neutralisation current varies over time. Mathematically it can be shown that a noise term in the overall noise of a drift detector depends on momentary pulse frequency, and thus on the varying value of neutralisation current. In a somewhat simplified manner we may state that the neutralising current is a source of noise, which limits the resolution that can be obtained with a drift detector.

It is not possible to copy the ramp-and-neutralise cycle described above from PIN detector applications to drift detectors, because although in principle eliminating the continuous noisy neutralisation current, it would just introduce another error source. The stray capacitances inherent to a FET change as a function of voltage, which would cause the indication of the energy of detected quanta depend on whether they were detected at the beginning of or close to the end of the ramp. In other words, applying the ramp-and-neutralise cycle would spread an energy peak obtained as an output of the detector in a relatively hardly predictable manner.

An objective of the present invention is to present a detector appliance based on a drift detector in which the noise-introducing effect of neutralisation current is reduced. An additional objective of the invention is to present a method for operating a drift detector with reduced noise-introducing effect from neutralisation current. A yet another objective of the invention is to provide a detector appliance for detecting quanta of electromagnetic radiation with fast response and good energy resolution.

The objectives of the invention are achieved by rapidly shooting a pulse of neutralising current to the detector element of a drift detector repeatedly after one or only a few quanta have been measured.

According to a first aspect of the invention, a detector appliance comprises:
 a semiconductor detector component adapted to be exposed to electromagnetic radiation,
 a amplifier component integrated with said semiconductor detector component to form a drift detector,
 a neutralising current path for conducting a neutralising current through said amplifier component to said semiconductor detector component and
 a switch coupled to said neutralising current path, said switch being adapted to control the flowing of said neutralising current.

According to a second aspect of the invention, a detector appliance comprises:
 a drift detector chip comprising a detector diode and an integrated field-effect transistor adapted to act as an amplifying component, a preamplifier with an input coupled to a source electrode of said integrated field-effect transistor and an output, a linear amplifier having an input coupled to the output of said preamplifier and comprising a timing channel adapted to produce a timing pulse, a latch circuit coupled to receive a timing pulse from said timing channel and adapted to sample a received timing pulse and to temporarily store a sampled received timing pulse, a neutralisation current switch coupled between said latch circuit and said integrated field-effect transistor, a latch emptying switch coupled between said latch circuit and a fixed potential, and a pulse generator having an input coupled to receive a timing pulse from said timing channel, a first output coupled to control a state of conduction of said neutralisation current switch and a second output coupled to control a state of conduction of said latch emptying switch;

wherein said pulse generator is adapted to respond to receiving a timing pulse by first setting said neutralisation current switch into conductive state and thereafter setting said neutralisation current switch into nonconductive state and said latch emptying switch into conductive state.

According to a third aspect of the invention, a detector appliance comprises:

a drift detector chip comprising a detector diode and an integrated field-effect transistor adapted to act as an amplifying component, a preamplifier with an input coupled to a source electrode of said integrated field-effect transistor and an output, a linear amplifier having an input coupled to the output of said preamplifier and being adapted to produce an amplified pulse indicative of a hit of a quantum being detected in the detector diode, a neutralisation current switch coupled between a neutralisation current source and said integrated field-effect transistor, and a timer having an output coupled to control a state of conduction of said neutralisation current switch;

wherein said timer is adapted to repeatedly set said neutralisation current switch into conductive state and thereafter into non-conductive state.

According to a fourth aspect of the invention a method for neutralising accumulated charge in a drift detector comprises:

producing an indication of an occurred hit of a quantum in the drift detector, and based on said indication, triggering a pulse of deliberately increased neutralisation current into the drift detector for the duration of a limited time interval.

According to a fifth aspect of the invention a method for neutralising accumulated charge in a drift detector comprises:

regularly triggering a pulse of deliberately increased neutralisation current into the drift detector for the duration of a limited time interval, and tuning an operational characteristic of such regular triggering in proportion to monitored accumulation of charge in the drift detector, the operational characterstic being at least one of the following: an amount of how much said neutralisation current is increased, a frequency at which triggering occurs, a duty cycle of triggered pulses of deliberately increased neutralisation current.

A synchronised neutralising strategy according to an embodiment of the invention is such where individual hits of quanta are observed, and a rapid, neutralising current pulse is shot to the detector element after each hit or after a small number of consecutive hits. An alternative, unsynchronised neutralising strategy according to another embodiment of the invention is such where synchronisation is performed regularly in cycles short enough to only allow a small number of hits between consecutive neutralisation rounds.

The structure and operation of typical known drift detectors already involves producing a so-called timing pulse as a response to an individual quantum hitting the detector. The purpose of the timing pulse is to act as an accurate indicator of the moment of time when the hit occurred. The height or amplitude of a timing pulse is not an accurate indicator of quantum energy, but has some approximate correspondence therewith. It is thus possible to use a slightly delayed timing pulse to trigger a neutralising event after each individual hit at the detector, or to collect a few consecutive timing pulses and neutralise their combined charge accumulation effect in a collective shot. Such action constitutes synchronised neutralisation.

If the accuracy at which the amplitude of a timing pulse approximates detected quantum energy is not enough, it is possible to use fine tuning to more accurately determine the amount of neutralisation current to be administrated in each shot. An advantageous fine tuning arrangement utilises a feedback loop, which monitors a voltage level indicative of accumulated charge at the FET and controls accordingly the amplification factor of a controllable amplifier, through which the neutralisation current is conveyed. Basically it would also be possible to obtain an indication of the accurate quantum energy from the actual measurement channel, where a measurement pulse is formed parallelly with but with more accuracy than the timing pulse.

In unsynchronised or asynchronous neutralisation the timing pulses are not necessarily needed to trigger shots of neutralisation current, because the last-mentioned are delivered according to a fixed time schedule. However, in order to ensure that not too many hits will occur between consecutive neutralisation rounds, it may be advantageous to monitor at least the frequency of timing pulses and to adaptively set the neutralisation frequency so that it is not smaller than a predetermined fraction of the frequency at which hits occur in the detector.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
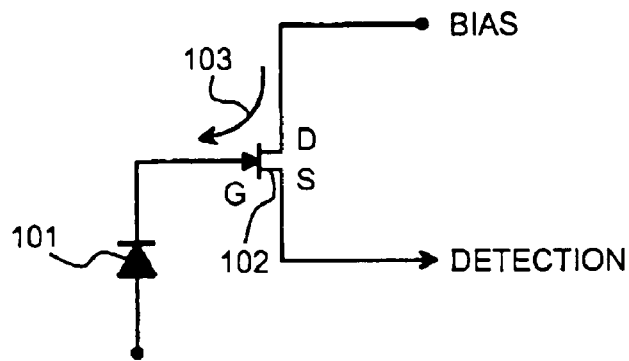
FIG. 1 illustrates a known principle of a drift detector
Figure 2:
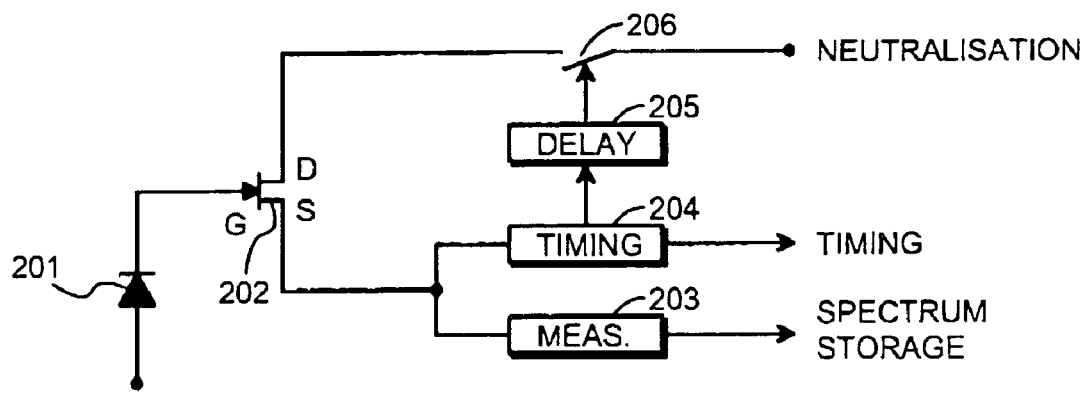
FIG. 2 illustrates a principle of a detector appliance according to an embodiment of the invention.

FIG. 2 is a schematic block diagram of a detector appliance according to an embodiment of the invention. A detector element 201 is adapted to be exposed to quanta of electromagnetic radiation, and to offer advantageous conditions for a photoelectric effect causing accumulation of charge to electrodes of the detector element 201. An amplifying transistor element 202, typically a FET, is coupled to the detector element 201 in a way well known from the technology of drift detectors.

From the transistor element 202 there are couplings to a measurement channel 203 and a timing channel 204. Also these may be essentially similar to what has been known from prior art. However, from the timing channel 204 there is also a coupling through a delay element 205 to a neutralisation current switch 206. A neutralisation current path couples the neutralisation current switch 206 to the entity comprising the detector element 201 and the transistor element 202.

The detector appliance of FIG. 2 operates as follows. When a quantum of electromagnetic radiation of certain energy hits the detector element 201, a timing pulse occurs in the timing channel 204 and a measurement pulse occurs in the measurement channel 203 according to well known operating principles of solid-state radiation detectors and their associated spectrum analysers. In addition to being conducted further in the timing channel for use in timing according to prior art, a copy of the timing pulse is now also taken to the delay element 205. The purpose of the delay element 205 is to delay the propagation of the timing pulse by the amount of time it takes to collect all charge that was accumulated as a result of the quantum hitting the detector, and to formulate a corresponding measurement pulse. Until now the neutralisation current switch 206 has remained in a nonconductive state, meaning that contrary to the prior art principle of drift detectors, there has not been any continuous neutralisation current.

After forming the measurement pulse has been completed, the timing pulse is released from the delay element 205 towards the neutralisation current switch 206.

This turns the neutralisation current switch 206 briefly into conductive state, which gives rise to a shot of neutralisation current that neutralises the accumulated charge from the detector element. If the neutralisation current switch 206 is some kind of analog switch, we may also assume that the height or amplitude of the timing pulse at least partly determined the amount of neutralisation current. Thus a larger neutralisation current pulse (larger in terms of current, longer in terms of time, or both) would follow the hit of a relatively energetic quantum than the hit of a less energetic quantum.

Even if conceptually a principle according to an embodiment of the invention is easiest to understand so that neutralisation current will "only" flow during the neutralisation current pulse, it should be noted that a more realistic view about the nature of the neutralisation current is the following. Due to the required biasing of the detector element 201, there will always be a small, yet definitely existing, leakage current through the transistor element 202 to the detector element 201. However, during the neutralisation current pulse an increase of hundreds of millivolts, even up to a volt, occurs in the drain voltage of the transistor element 202 (whereas the change in source potential due to a hit occurring in the detector element 201 is in the order of millivolts). This sharply rising drain voltage causes a correspondingly sharp, momentary increase in the leakage current. At the end of the neutralisation current pulse the drain voltage decreases to its former value, causing also the leakage current to assume its former, very much smaller value.

Figure 3:
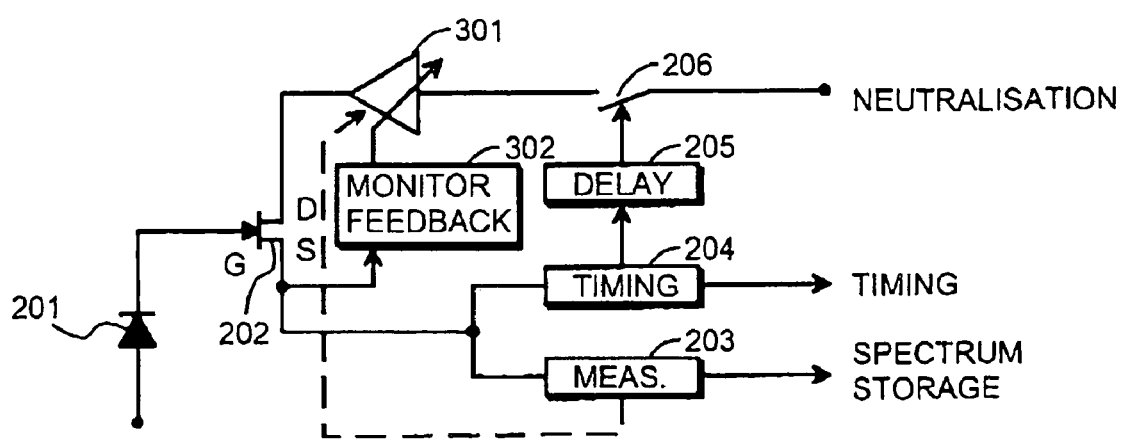
FIG. 3 illustrates a principle of a detector appliance according to another embodiment of the invention.

FIG. 3 is a schematic block diagram of a further developed detector appliance, in which fine tuning is used for correctly dimensioning the neutralisation current pulse. In addition to the functional blocks already described above with reference to FIG. 2, the detector appliance of FIG. 3 comprises a controllable amplifier 301 coupled between the neutralisation current switch 206 and the transistor element 202, as well as a monitoring and feedback element 302 coupled between the transistor element 202 and the controllable amplifier. The monitoring and feedback element 302 is adapted to monitor a voltage level (here the source voltage) occurring at the transistor element 202, said voltage level being indicative of charge accumulated in the detector element 201. Additionally the monitoring and feedback element 302 is adapted to control the amplification factor of the controllable amplifier 301 to be proportional to the amount of said accumulated charge.

In addition to the operation described above with reference to FIG. 2, the following takes place in the detector appliance of FIG. 3. At the time when the timing pulse is released from the delay element 205, the monitoring and feedback element 302 has completed measuring the voltage level at transistor element 202, which is the same as saying that it has measured, how much charge was accumulated in the detector element 201 as a result of the most recent hit. The monitoring and feedback element 302 has also set the amplification factor of the controllable amplifier 301 appropriately. Now when the timing pulse turns the neutralisation current switch 206 briefly into conductive state, the final amplitude of the neutralisation current pulse is determined in the controllable amplifier 301 so that its neutralising effect in the detector element 201 exactly meets and counteracts the amount of most recently accumulated charge.

Also drawn in FIG. 3, if only with a dashed line, is an alternative or additional path for fine tuning information from the measurement branch 203 to the controllable amplifier 301. Basically it would be possible to obtain the fine tuning information from the measurement branch 203, although a more direct coupling as explained above probably results in more accurate operation.

Figure 4:
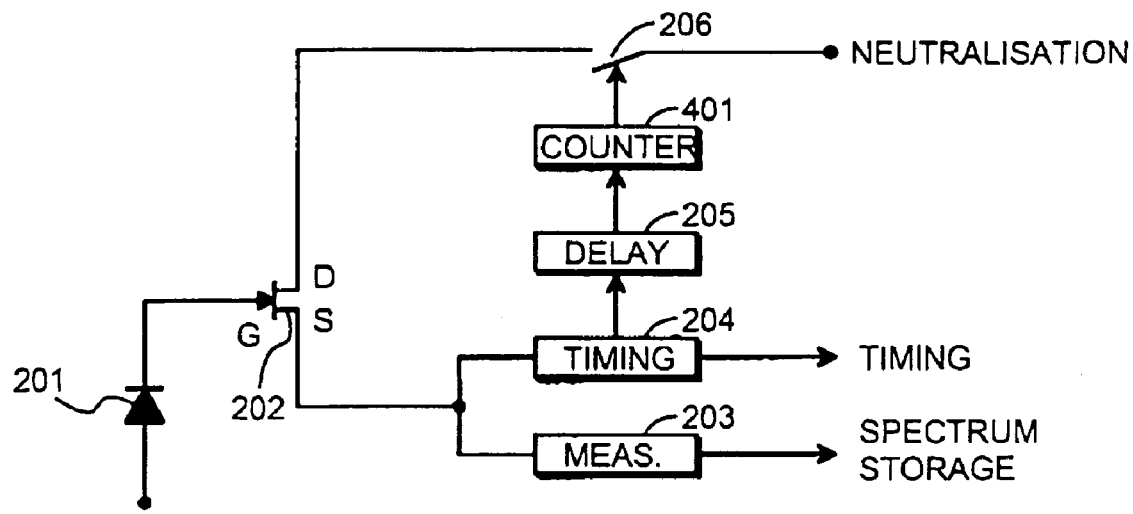
FIG. 4 illustrates a principle of a detector appliance according to yet another embodiment of the invention.

FIG. 4 is a schematic block diagram of another variation of a detector appliance, where the basic principle of synchronised neutralisation is otherwise applied but neutralisation is not performed after each hit. To the contrary, as a circuit element additional to those illustrated above in FIG. 2 the detector appliance of FIG. 4 comprises an accumulative counter 401, which counts a small number (e.g. between 2 and 10) of timing pulses and sums their amplitudes, before releasing the so formed combined pulse to the neutralisation current switch. The operation of this detector appliance follows otherwise that described above with reference to FIG. 2, but neutralisation only takes place after each N pulses, where positive integer N equals the counting cycle of the counter, and then with a neutralisation current pulse that represents the combined effect of N most recently generated timing pulses.

It would naturally be possible to augment the detector appliance of FIG. 4 with fine tuning, e.g. in the same way as in FIG. 3. Here, as also in the arrangement of FIG. 3, if the "fine tuning" coupling is dominant and accurate enough, so that it alone would suffice to correctly determine the amount of needed neutralisation, it is at least theoretically possible to even neglect the amplitude aspect of timing pulse(s) and to use it/them only as an indicator about the occurrence in time of hits. Prior to a controllable amplifier (c.f. 301 in FIG. 3) the neutralisation current pulse would thus always have a constant magnitude, which would be appropriately changed through the combined effect of a monitoring and feedback coupling and the controllable amplifier.

Figure 5:
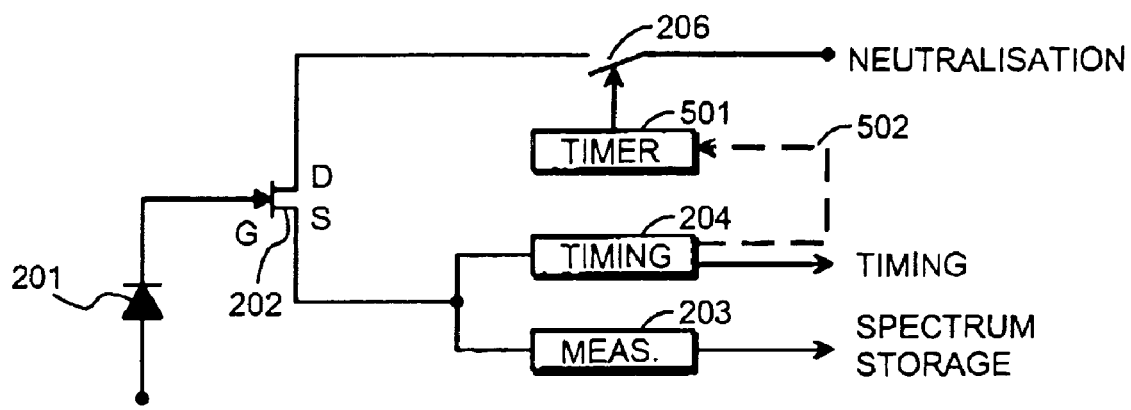
FIG. 5 illustrates a principle of a detector appliance according to yet another embodiment of the invention.

FIG. 5 is a schematic block diagram of a detector appliance in which unsynchronised neutralisation is implemented. As a difference to the the embodiments shown in FIGS. 2 to 4, there is no direct connection from the generation of timing pulses to the triggering of neutralisation current pulses. Instead there is a timer 501, which regularly triggers a neutralisation current pulse.

The timing cycle applied by the timer 501 should be short enough to only allow a relatively limited number of hits, say between 1 and 15, between consecutive neutralisation current pulses. If a larger number of hits are allowed between consecutive neutralisation current pulses, there follows at least the disadvantage explained earlier with reference to the inapplicability of any ramp-and-neutralise cycle copied from PIN detectors: hits detected very quickly after the-most recent neutralisation event would appear on the energy axis in a different places than hits occurring very close to the end of the neutralisation cycle.

Since the rate at which hits occur in the detector may vary considerably, it may prove to be advantageous to have an indirect coupling between the generation of timing pulses and the triggering of neutralisation current pulses. In FIG. 5 this indirect coupling appears in the form of a connection 502, which gives to the timer 501 information about the frequency of detected hits. The timer 501 is adapted to take this information into account by selecting the length of the currently applied neutralisation cycle to be in appropriate relation to the frequency of detected hits. Similar feedback to the timer 501 could also be taken from a fine tuning arrangement, if one exists.

The occurrence of hits in the detector is a result from a stochastic process, which means that if timed neutralisation with an essentially constant repetition cycle of triggering neutralisation current pulses, the number of hits that will occur between consecutive neutralisation rounds will vary. This implies that also the amount of accumulated charge, and thus also the needed neutralising effect, i.e. amount of charge to be carried by a neutralisation current pulse, will vary. Two approaches can be taken to account for this variation. According to a first alternative, the neutralisation current pulse will be given by coupling the detecting element to a very accurately regulated fixed potential, so that it will always assume a constant potential, essentially letting the neutralisation current pulse to be self-regulated. According to a second alternative, a fine tuning arrangement is used similarly as in e.g. FIG. 3, so that the actual amount of accumulated charge is monitored at the FET and the neutralisation current pulse will be administered through an appropriately controlled amplifier.

Figure 6:
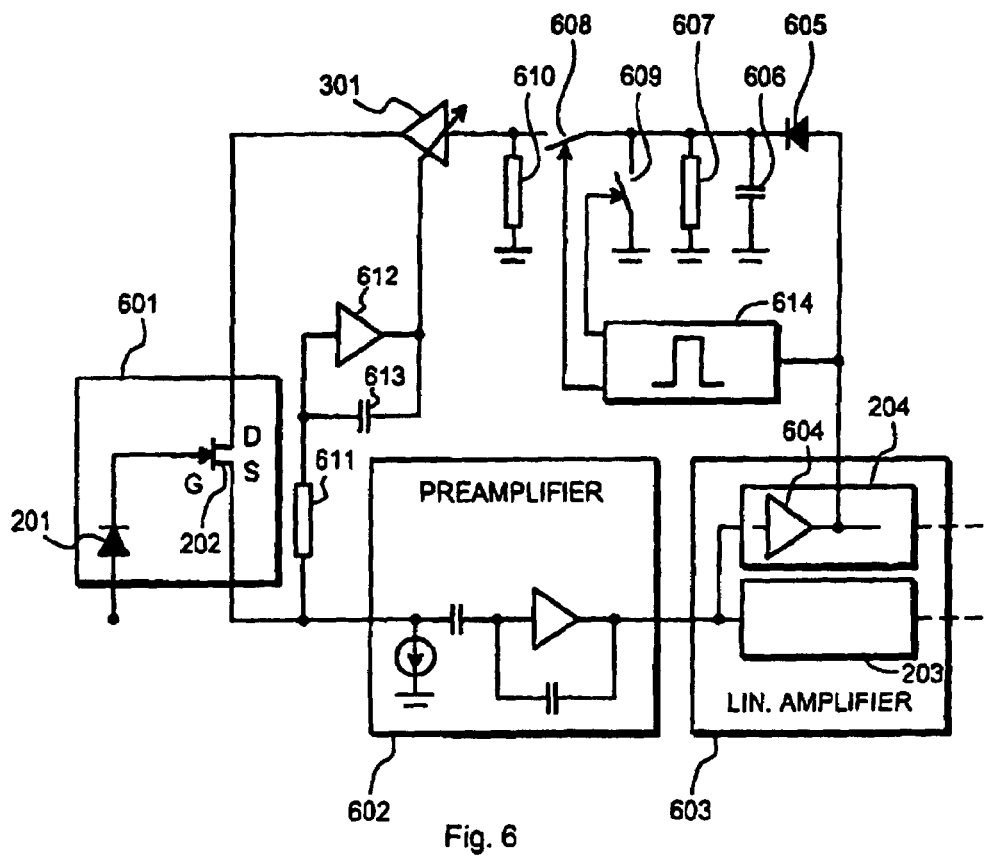
FIG. 6 illustrates a detector appliance according to an embodiment of the invention in more detail.

FIG. 6 is a more detailed schematic diagram of a detector appliance according to an embodiment of the invention. This detector appliance is arranged to operate according to the principle illustrated above in FIG. 3.

A detector diode 201 and an associated FET 202 are integrated together on a drift detector chip 601. From the source of the FET 202 there is a coupling through a preamplifier 602 to a linear amplifier 603, which comprises a measurement channel 203 and a timing channel 204. From the output of a timing amplifier 604 in the timing channel 204 there is a coupling to the anode of a diode 605, which together with a capacitor 606 and a resistor 607 coupled between the cathode of the diode 605 and ground constitutes a latch circuit. The cathode of the diode 605, which also constitutes an output of said latch circuit, is coupled to two switches. Of these, a first switch 608 is coupled between the output of said latch circuit and the input of a controllable amplifier 301, while a second switch 609 is coupled between the output of said latch circuit and a fixed potential, which here is the ground potential.

A resistor 610 is coupled between the input of said controllable amplifier 301 and ground. The output of said controllable amplifier 301 is coupled to the drain of the FET 202 in the drift detector chip 601.

A resistor 611 is coupled between the source of the FET 202 and the input of a feedback amplifier 612, the output of which is coupled to a control input of the controllable amplifier 301. A capacitor 613 is coupled between the input and the output of the feedback amplifier 612.

An input of a pulse generator 614 is coupled to the output of the timing amplifier 604. Two outputs of the pulse generator 614 are coupled to drive the first and second switches 608 and 609 respectively.

The detector appliance of FIG. 6 operates as follows. A signal pulse obtained from the detector chip 601 is first amplified in a preamplifier 602 and taken to a linear amplifier 603, in which a measurement channel 203 is adapted to accurately estimate, from the height and shape of the signal pulse, the energy of the quantum that caused said signal pulse in the detector chip 601. A timing pulse generated in a timing channel 204 is taken from the output of the timing amplifier 604 and sampled into a latch circuit consisting of diode 605, capacitor 606 and resistor 607. The resulting voltage across the capacitor 606 in the latch circuit is representative of the height of the timing pulse, and thus roughly indicative of the original accumulated charge in the detector chip 601. At this stage both switches 608 and 609 are in a non-conductive state.

The pulse generator 614 also receives the timing pulse from the timing amplifier 604. After having received the rising edge of the timing pulse, the pulse generator 614 waits for a predetermined delay, the length of which has been determined so that it allows the measurement channel 203 to measure the height of a measurement pulse that describes the energy of the detected quantum. After the delay has expired, the pulse generator 614 sets the first switch 608 into conductive state. The voltage that was previously stored in the latch circuit now briefly increases the voltage coupled to the drain of the FET 202, which causes a neutralisation current to flow into the detector chip 601 where it neutralises the accumulated charge. A short time instant later the pulse generator 614 sets the first switch 608 back into non-conductive state and the second switch 609 into conductive state. This has the effect of terminating the neutralisation current and emptying the latch circuit, making it ready to sample a next timing pulse.

During the short time interval during which the neutralisation current is flowing the measurement channel should be muted, in order to keep it from receiving the noise caused by the neutralisation current. Since the time aspects involved in the operation of the pulse generator 614 are well known, it is easy to make signal processing entities within and/or after the linear amplifier 603 ignore the inputs received during each corresponding time interval. It is expected that a detector appliance according to an embodiment of the invention is applicable for measuring mean quantum frequencies from around 1000 hits per second to several tens of thousands of hits per second. At an exemplary mean quantum frequency of about 10,000 hits per second we may assume that the time it takes to properly form and collect a single measurement pulse in the measurement channel 203 is in the order of 4 microseconds. After that a time interval of 2–3 microseconds can well be utilised for synchronised neutralisation, causing a corresponding muted time in the measurement channel, without causing any remarkable effect on the measurement.

The height of the timing pulse obtained from the timing channel 204 is only roughly indicative of the amount of charge that should be neutralised. Therefore the detector appliance includes also the monitoring and feedback coupling comprising resistor 611, amplifier 612 and capacitor 613 as well as the controllable amplifier 301. The effect of said monitoring and feedback coupling is that it tries to keep the source potential of the FET 202 constant. The larger the deviation from a reference value, the larger neutralisation current pulse is needed. The last-mentioned aim is accomplished by using the monitoring and feedback coupling to control the amplification factor of the controllable amplifier 301, through which the neutralisation current pulse arrives to the detector chip.

Figure 7:
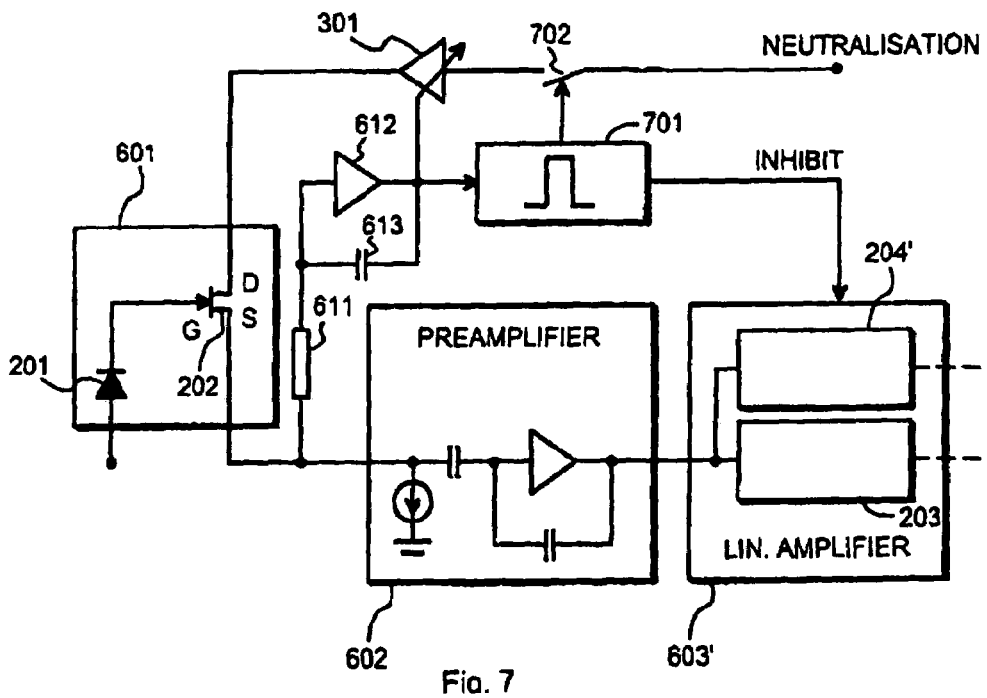
FIG. 7 illustrates a detector appliance according to another embodiment of the invention in more detail.

FIG. 7 is a more detailed schematic diagram of a detector appliance according to another embodiment of the invention. A timer 701 is employed to regularly set a neutralisation current switch 702 into a conductive state for a short time interval. A monitoring and feedback coupling similar to that described in association with FIG. 6 is used both to control the amplification factor of a controllable amplifier 301, through which the neutralisation current flows to the detector chip 601 during said short time intervals, and to give information to the timer 701 about the actual need for neutralisation. The timer 701 may respond to such information by changing the frequency or duty cycle, or both, of the pulses applied to the switch 702. If the regulating effect of the monitoring and feedback coupling and the timer 701 is accurate and effective enough, it may even be possible to dispose of the controllable amplifier 301. The linear amplifier 603' and its timing channel 204' are otherwise similar to those 603 and 204 illustrated in FIG. 6 respectively, but they are now responsive to an external inhibit signal, obtained from the timer 701, to mute the measurement for the duration of the neutralisation current pulses in order to keep the noise caused by the neutralisation current from interfering with the measurement.

Figure 8:
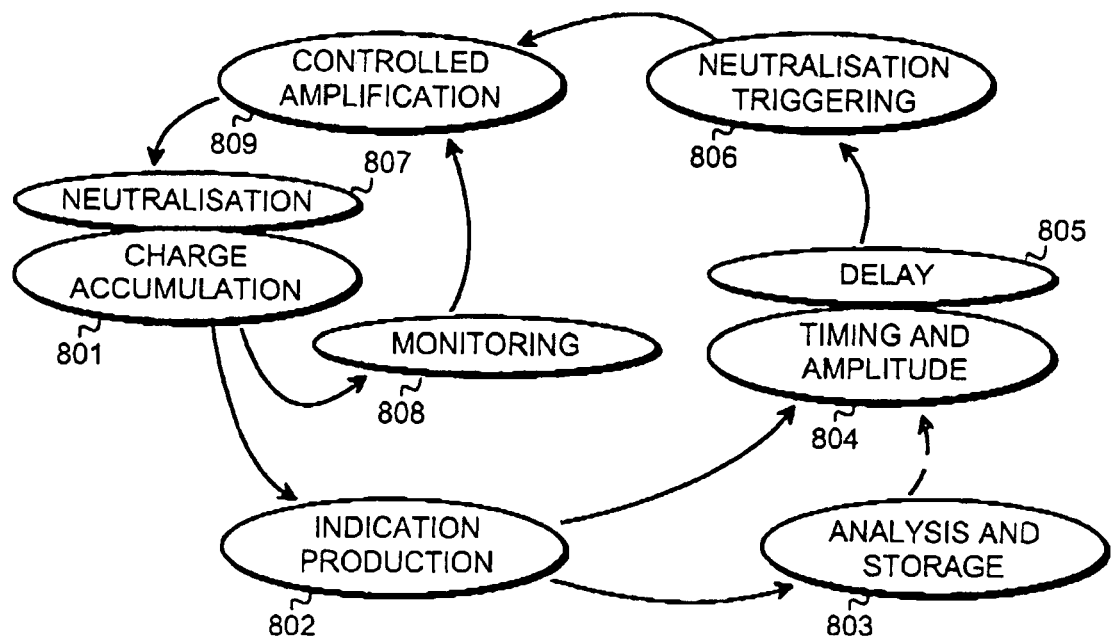
FIG. 8 illustrates some method aspects of an embodiment of the invention and FIG. 9 illustrates some method aspects of another embodiment of the invention.
Figure 9:
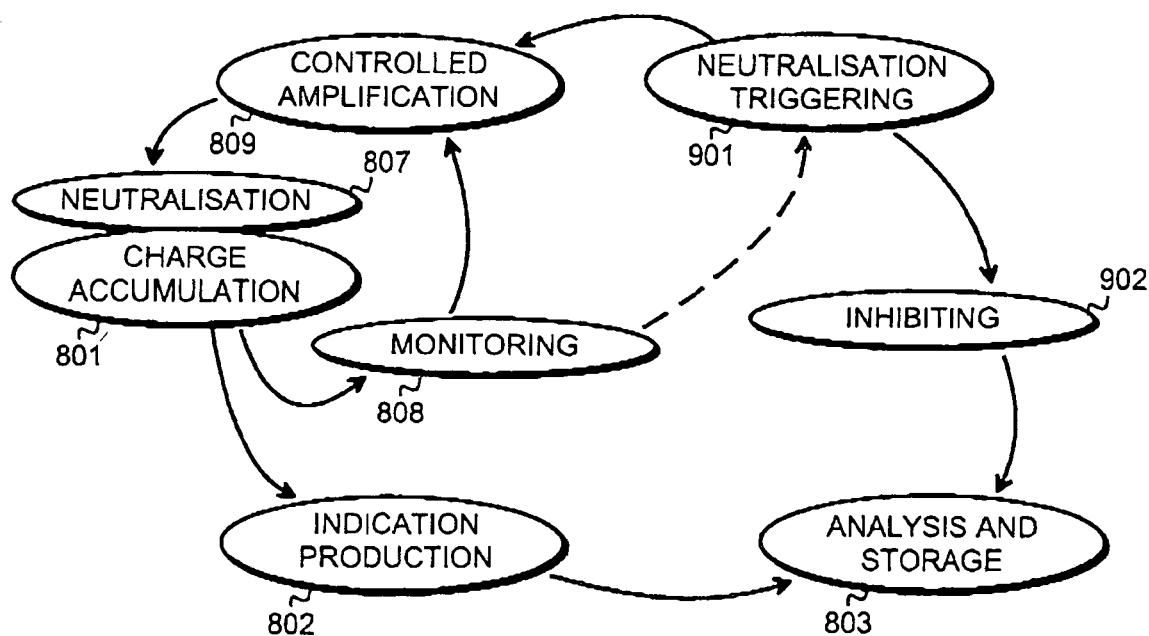

FIGS. 8 and 9 illustrate some method aspects of the invention. Steps 801 and 802 correspond to producing an indication of an occurred hit of a quantum in the drift detector on the basis of observed accumulation of charge. In a way known as such, the indications are taken forward for analysis and storage according to step 803. Timing and amplitude information are obtained at step 804 (which receives its input from at least one of steps 802 and 803) by sampling a timing pulse and storing it preferably in a form of voltage. Step 805 corresponds to waiting for a predetermined delay in order to allow an exact measurement to take place. Basically based on the indication produced at steps 801 and 802, a pulse of deliberately increased neutralisation current is triggered into the drift detector for the duration of a limited time interval at step 806, which practically involves releasing the sampled timing pulse from storage to a neutralisation current path leading to the drift detector. Step 807 represents the actual incident of charge neutralisation in the detector.

In order to perform fine tuning, there are also shown steps 808 and 809 which represent monitoring the accumulation of charge in the drift detector and tuning an amount of how much said neutralisation current is increased, in proportion to monitored accumulation of charge in the drift detector. Although step 809 recites controlled amplification, controlled attenuation could naturally be used as an alternative.

FIG. 9 illustrates the unsynchronised alternative method, in which step 901 involves regularly triggering a pulse of deliberately increased neutralisation current into the drift detector for the duration of a limited time interval, and step 902 shows how the timer that performs the triggering is also adapted to produce measurement inhibiting signals to the analysis and storage processing of step 803. In addition to the meaning of steps 808 and 809 described above, there is also shown with a dashed line the possibility of tuning an operational characteristic of the timer in proportion to monitored accumulation of charge in the drift detector. Such operational characteristic may being at least one of an amount of how much said neutralisation current is increased, a frequency at which triggering occurs, and a duty cycle of the triggered neutralisation current pulses.

The invention claimed is:

1. A detector appliance for detecting quanta of electromagnetic radiation. comprising:
   a semiconductor detector component adapted to be exposed to electromagnetic radiation,
   a amplifier component integrated with said semiconductor detector component to form a drift detector,
   a neutralising current path for conducting a neutralising current through said amplifier component to said semiconductor detector component, and
   a timing channel adapted to produce an indication of a detection event,
   a switch coupled to said neutralising current path, said switch being adapted to control the flowing of said neutralising current and being responsive to an indication obtained from said timing channel by increasing neutralising current for a time interval following an indication obtained from said timing channel, and
   a delay element between said timing channel and said switch for delaying the beginning of said time interval by a predetermined amount of time after obtaining an indication from said timing channel.

2. A detector appliance according to claim 1, wherein said neutralising current path is responsive to a magnitude of said indication obtained from said timing channel by determining an amount of neutralisation current to flow.

3. A detector appliance according to claim 1, wherein said timing channel is adapted to inhibit measurement in the detector appliance during said time intervel.

4. A detector appliance according to claim 1, comprising:
   a controllable amplifier on said neutralising current path and a monitoring and feedback element coupled between said amplifier component and said controllable amplifier and adapted to control said controllable amplifier on the basis of monitored change of potential in said amplifier component, said change of potential being indicative of an amount of accumulated charge in said semiconductor detector component.

5. A detector appliance according to claim 1, comprising a timer coupled to control said switch and adapted to repeatedly set said switch Into conductive and non-conductive state.

6. A detector appliance according to claim 5, comprising:
a monitoring and feedback element coupled to said amplifier component and adapted to monitor a change of potential in said amplifier component, said change of potential being indicative of an amount of accumulated charge in said semiconductor detector component, and
a feedback coupling from said monitoring and feedback element to said timer.

7. A detector appliance according to claim 5, comprising:
a timing channel adapted to produce indications of detection events and
a feedback coupling from said timing channel to said timer.

8. A detector appliance according to claim 5, wherein said timer is adapted to produce an inhibit signal for inhibiting measurements in said detector appliance during times when said switch is in a state allowing increased flow of neutralising current.

9. A detector appliance for detecting quanta of electromagnetic radiation, comprising:
a drift detector chip comprising a detector diode and an integrated field-effect transistor adapted to act as an amplifying component,
a preamplifier with an input coupled to a source electrode of said integrated field-effect transistor and an output,
a linear amplifier having an input coupled to the output of said preamplifier and comprising a timing channel adapted to produce a timing pulse,
a latch circuit coupled to receive a timing pulse from said timing channel and adapted to sample a received timing pulse and to temporarily store a sampled received timing pulse,
a neutralisation current switch coupled between said latch circuit and said integrated field-effect transistor,
a latch emptying switch coupled between said latch circuit and a fixed potential, and
a pulse generator having an input coupled to receive a timing pulse from said timing channel, a first output coupled to control a state of conduction of said neutralisation current switch and a second output coupled to control a state of conduction of said latch emptying switch;
wherein said pulse generator is adapted to respond to receiving a timing pulse by first setting said neutralisation current switch into conductive state and thereafter setting said neutralisation current switch into non-conductive state and said latch emptying switch into conductive state.

10. A detector appliance according to claim 9, additionally comprising a controllable amplifier on a current path between said latch circuit and said integrated field-effect translator, and additionally comprising a monitoring and feedback element coupled between said Integrated field-effect transistor and said controllable amplifier and adapted to control said controllable amplifier on the basis of monitored change of potential in said integrated field-effect transistor, said change of potential being indicative of an amount of accumulated charge in said detector diode.

11. A detector appliance for detecting quanta of electromagnetic radiation, comprising:
a drift detector chip comprising a detector diode and an integrated field-effect transistor adapted to act as an amplifying component,
a preamplifier with an input coupled to a source electrode of said integrated field-effect transistor and an output,
a linear amplifier having an input coupled to the output of said preamplifier and being adapted to produce an amplified pulse indicative of a hit of a quantum being detected in the detector diode.
a neutralisation current switch coupled between a neutralisation current source and said integrated field-effect transistor, and
a timer having an output coupled to control a state of conduction of said neutralisation current switch;
wherein said timer is adapted to repeatedly set said neutralisatlon current switch into conductive state and thereafter into non-conductive state.

12. A detector appliance according to claim 11, additionally comprising a controllable amplifier on a current path between said neutralisation current source and said integrated field-effect transistor, and additionally comprising a monitoring and feedback element coupled between said integrated field-effect transistor and said controllable amplifier and adapted to control said controllable amplifier on the basis of monitored change of potential in said integrated field-effect transistor, said change of potential being indicative of an amount of accumulated charge in said detector diode.

13. A detector appliance according to claim 12, wherein said monitoring and feedback element is additionally adapted to control an operational characteristic of said timer on the basis of monitored change of potential in said integrated field-effect transistor, said change of potential being indicative of an amount of accumulated charge in said detector diode, and said operational characteristic comprising at least one of: operating frequency, duty cycle.

14. A method for neutralising accumulated charge in a drift detector, comprising:
producing an indication of an occurred hit of a quantum in the drift detector, and
based on said indication, triggering a pulse of deliberately increased neutralisation current into the drift detector for the duration of a limited time interval.

15. A method according to claim 14, wherein a pulse of deliberately increased neutralisation current is triggered as a response to each individually produced indication of an occurred hit of a quantum in the drift detector.

16. A method according to claim 15, wherein said indication is a timing pulse obtained from a timing channel of a linear amplifier, and the method comprises:
sampling said timing pulse and storing the sampled timing pulse in a form of voltage,
waiting for a predetermined delay and
after said predetermined delay, releasing the sampled timing pulse from storage to a neutralisation current path leading to the drift detector.

17. A method according to claim 14, additionally comprising:
monitoring the accumulation of charge in the drift detector and
tuning an amount of how much said neutralisation current is increased, in proportion to monitored accumulation of charge in the drift detector.

18. A method according to claim 14, wherein a pulse of deliberately increased neutralisation current is triggered as a response to an accumulated number of individually produced indications of occurred hits of a quantum in tile drift detector.

19. A method for neutralising accumulated charge in a drift detector, comprising:

regularly triggering a pulse of deliberately increased neutralisation current into the drift detector for the duration of a limited time interval, and tuning an operational characteristic of such regular triggering in proportion to monitored accumulation of charge in the drift detector, the operational characteristic being at least one of the following: an amount of how much said neutralisation current is increased, a frequency at which triggering occurs, a duty cycle of triggered pulses of deliberately increased neutralisation current.

* * * * *